US012208711B2

(12) United States Patent
Kim et al.

(10) Patent No.: US 12,208,711 B2
(45) Date of Patent: Jan. 28, 2025

(54) SEAT FOR VEHICLE

(71) Applicants: Hyundai Motor Company, Seoul (KR); Kia Corporation, Seoul (KR)

(72) Inventors: Mu Young Kim, Osan-Si (KR); Sang Do Park, Suwon-Si (KR); Ho Suk Jung, Hwaseong-Si (KR); Han Kyeol Cho, Seoul (KR); Jun Young Yun, Osan-si (KR); Jun Hwan Lee, Seoul (KR); Chan Ho Jung, Gunpo-Si (KR); Sang Soo Lee, Goyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 115 days.

(21) Appl. No.: 18/150,004

(22) Filed: Jan. 4, 2023

(65) Prior Publication Data

US 2024/0092231 A1 Mar. 21, 2024

(30) Foreign Application Priority Data

Sep. 16, 2022 (KR) .................. 10-2022-0116924

(51) Int. Cl.
| | |
|---|---|
| *B60N 2/16* | (2006.01) |
| *B60N 2/02* | (2006.01) |
| *B60N 2/12* | (2006.01) |
| *B60N 2/22* | (2006.01) |

(52) U.S. Cl.
CPC ........... *B60N 2/12* (2013.01); *B60N 2/02246* (2023.08); *B60N 2/1615* (2013.01); *B60N 2/164* (2013.01); *B60N 2/165* (2013.01); *B60N 2/22* (2013.01); *B60N 2/02253* (2023.08)

(58) Field of Classification Search
CPC ........ B60N 2/12; B60N 2/1615; B60N 2/164; B60N 2/165
See application file for complete search history.

(56) References Cited

U.S. PATENT DOCUMENTS

| | | | | |
|---|---|---|---|---|
| 2019/0143851 | A1* | 5/2019 | Handigol | B60N 2/20 |
| | | | | 297/341 |
| 2019/0152352 | A1* | 5/2019 | Handigol | B60N 2/12 |
| 2022/0169154 | A1* | 6/2022 | Roche | B60N 2/065 |
| 2022/0379774 | A1* | 12/2022 | Kim | B60N 2/12 |

FOREIGN PATENT DOCUMENTS

| | | | | |
|---|---|---|---|---|
| CN | 115489409 A | * | 12/2022 | |
| CN | 117719401 A | * | 3/2024 | ............... B60N 2/12 |
| DE | 102009019014 A1 | * | 11/2010 | ............... B60N 2/12 |
| FR | 2917024 A1 | * | 12/2008 | ............ B60N 2/065 |
| KR | 20210017721 A | * | 2/2021 | |
| KR | 102338310 B1 | | 12/2021 | |
| WO | WO-2008057036 A1 | * | 5/2008 | ........... B60N 2/0228 |
| WO | WO-2022120608 A1 | * | 6/2022 | |

* cited by examiner

*Primary Examiner* — Timothy J Brindley
(74) *Attorney, Agent, or Firm* — Banner & Witcoff, Ltd.

(57) ABSTRACT

A seat for a vehicle in which user convenience may be improved by implementing various postures with a simple configuration is provided. The seat for a vehicle includes a pair of support rails coupled to the vehicle and arranged to be spaced apart from side to side, a first slide unit slidably installed back and forth on the support rail, a second slide unit slidably installed back and forth on the first slide unit, a pair of cushion side frames spaced apart from side to side, a first link member connecting the cushion side frame and the first slide unit, and a second link member connecting the cushion side frame and the second slide unit.

17 Claims, 6 Drawing Sheets

SEAT FOR VEHICLE

CROSS-REFERENCE TO RELATED APPLICATION(S)

This application claims benefit of priority to Korean Patent Application No. 10-2022-0116924 filed on Sep. 16, 2022 in the Korean Intellectual Property Office, the disclosure of which is incorporated herein by reference in its entirety.

TECHNICAL FIELD

The present disclosure relates to a seat for a vehicle capable of improving user convenience by implementing various postures.

BACKGROUND

A seat for a vehicle may include various seat adjustment devices and convenience devices installed inside and outside the seat, in addition to the basic configuration of a seat cushion for accommodating the lower body, a seat back supporting the upper body, and a headrest supporting the head and neck.

For example, the seat adjustment device may include a tilting device for adjusting the tilting angle of the seat cushion, a height device for adjusting the height of the seat, and a position adjusting device for adjusting the front and rear positions of the seat.

The seat may be equipped with a relaxation function for a user's comfortable posture. The relaxation function may adjust the angle of the seat back and the seat cushion to distribute the user's body pressure as much as possible, so that the user's posture becomes a posture allowing the user to feel comfortable.

A seat may be provided for a vehicle that may be driven in a height adjustment mode or a relaxation mode. However, if the seat for a vehicle include a pair of first length adjustment portions driven by a first motor in the front and a second length adjustment portion driven by a second motor in the rear, there may be a problem in that the configuration is complicated and costs are increased.

Moreover, the second length adjustment portion may be disposed only on one side of the left and right sides of the sheet, and it may be difficult for the other side to restrict the degree of freedom. Accordingly, there is a gap between the left and right links, and a problem in which the deformation angle of the seat back increases if a rear collision occurs.

SUMMARY

An aspect of the present disclosure is to provide a seat for a vehicle capable of improving user convenience by implementing various postures with a simple configuration.

A vehicle seat may comprise: a pair of support rails coupled to a vehicle and arranged to be spaced apart from each other; a first slide unit slidably installed on a support rail of the pair of support rails; a second slide unit slidably installed on the first slide unit; a pair of cushion side frames spaced apart from each other; a first link member coupling a cushion side frame of the pair of cushion side frames and the first slide unit; and a second link member coupling the cushion side frame of the pair of cushion side frames and the second slide unit.

The first slide unit may be coupled to the support rail of the pair of support rails and comprises a moving rail that slides back and forth in a longitudinal direction of the support rail by receiving power from a first motor, and the second slide unit is installed on the moving rail.

The vehicle seat may further comprise a support bracket coupled to the moving rail, for installation of the second slide unit, wherein the support bracket comprises, a mounting portion formed for installation of the second slide unit, and a first hinge portion for coupling of the first link member.

The second slide unit may comprise a second hinge portion for coupling of the second link member.

The second slide unit may comprise, a lead screw disposed on the moving rail in a longitudinal direction of the moving rail and having a thread formed on an outer circumferential surface; a mounting bracket positioned between the moving rail and a second moving rail; a second motor comprising a motor shaft and disposed on the mounting bracket; and a gearbox into which an end of the motor shaft of the second motor is inserted, wherein the lead screw passes through the gearbox such that the end of the motor shaft is engaged with the lead screw.

The second hinge portion may be formed on an outside of the gearbox.

A cushion side frame of the pair of cushion side frames may have a first hinge hole on a first location and a second hinge hole on a second location, a first end of the first link member may be rotatably hinged to the first hinge hole, and a second end of the first link member may be rotatably hinged to the first hinge portion, and a first end of the second link member may be rotatably hinged to the second hinge hole, and a second end of the second link member may be rotatably hinged to the second hinge portion.

The vehicle seat may further comprise a second motor applying a rotational force to the second link member, wherein a motor shaft of the second motor is coupled to a gearbox, and a sector gear meshing with an output gear of the gearbox is formed on one side of the second link member.

vehicle seat may further comprise a reclining unit interposed between a seat cushion and a seat back, wherein the reclining unit comprises a recliner that receives power of a motor via a shaft, and wherein the recliner is configured to be set in a locking state in which the seat back is fixed at a predetermined angle and an unlocked state in which the seat back is rotatable.

The vehicle seat may be configured to execute a relaxation mode by a first motor that provides power to the second slide unit such that the second slide unit is capable of sliding forward and backward and a second motor that applies a rotational force to the second link member.

In the relaxation mode, the second link member may be configured to rotate by the rotational force applied from the second motor and to lower a portion of the cushion side frame coupled to the second link member, the second slide unit is configured to slide by the first motor to move and rotate the cushion side frame of the pair of cushion side frames, and the first link member is configured to rotate and raise a portion of the cushion side frame coupled to the first link member.

The vehicle seat may further comprise a reclining unit interposed between a seat cushion and a seat back, wherein in the relaxation mode, the reclining unit is configured to adjust an angle of inclination of the seat back with respect to the seat cushion.

The vehicle seat may be configured to execute a getting on and off mode by a motor providing power to the second slide unit such that the second slide unit is capable of sliding forward and backward.

In the getting on and off mode, as the second slide unit slides by the motor, the second link member may be configured to relatively move and rotate in a longitudinal direction of the support rail, and the cushion side frame may be configured to rotate while moving together with the second link member, and the first link member may be configured to rotate and lower a portion of the cushion side frame coupled to the first link member.

A vehicle seat may comprise: a support rail coupled to a vehicle; a double slider installed to be slidable on the support rail; a cushion side frame; a front link member hinging the cushion side frame and a first portion of the double slider; and a rear link member hinging the cushion side frame and a second portion of the double slider, wherein the double slider comprises: a first slide unit hinged to the front link member, and a second slide unit hinged to the rear link member and movable relative to the first slide unit.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, the present disclosure will be described in detail with reference to illustrative drawings. In adding reference numerals to the components of respective drawings, it should be noted that the same components are given the same reference numerals as possible even if they are indicated on different drawings.

In this specification, terms such as first, second, third, and the like may be used to describe various components, but the order, size, position and the importance of these components are not limited by the terms such as first, second, third and the like, and the terms are named only for distinguishing one component from another.

Figure 1:
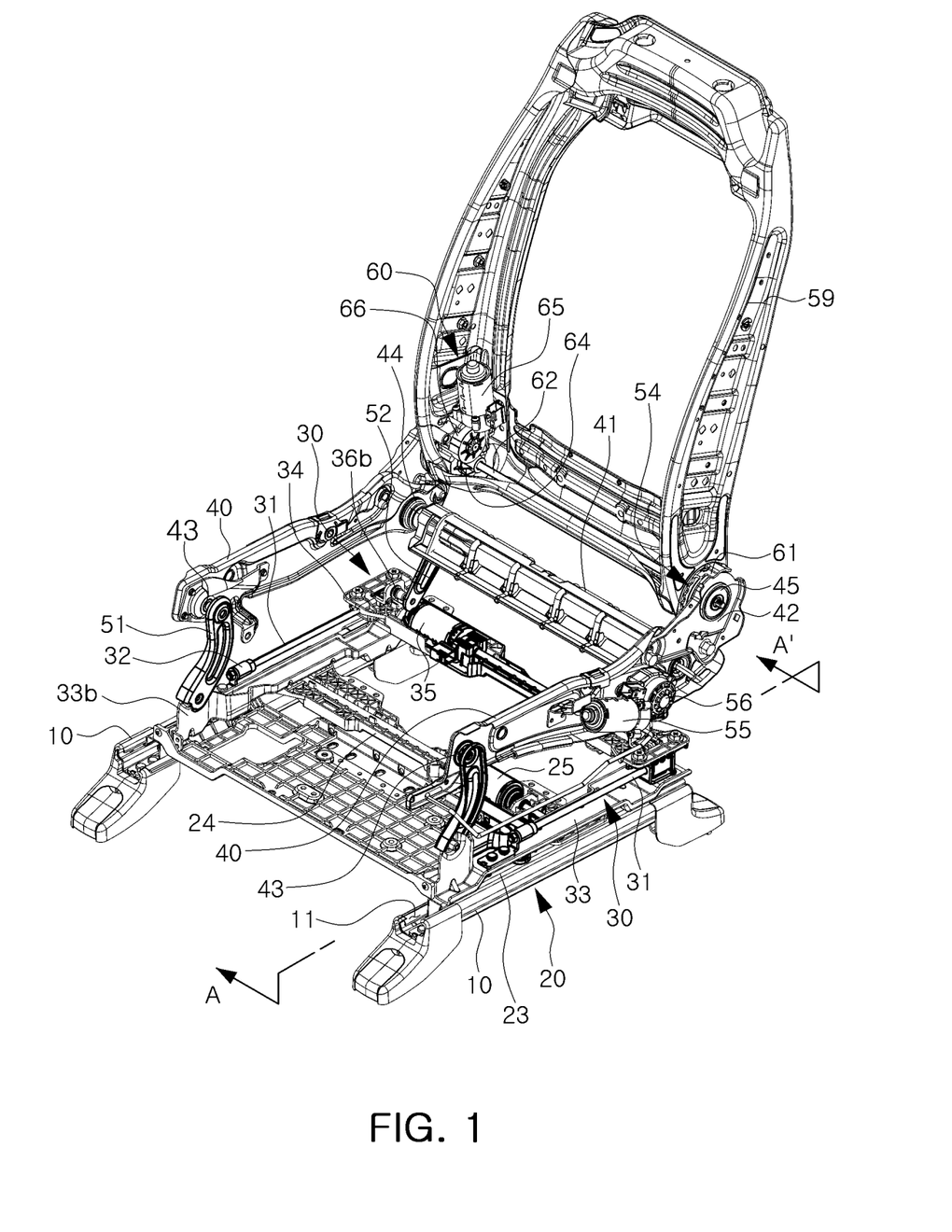
FIG. 1 is a perspective view showing an example seat for a vehicle.
Figure 2:
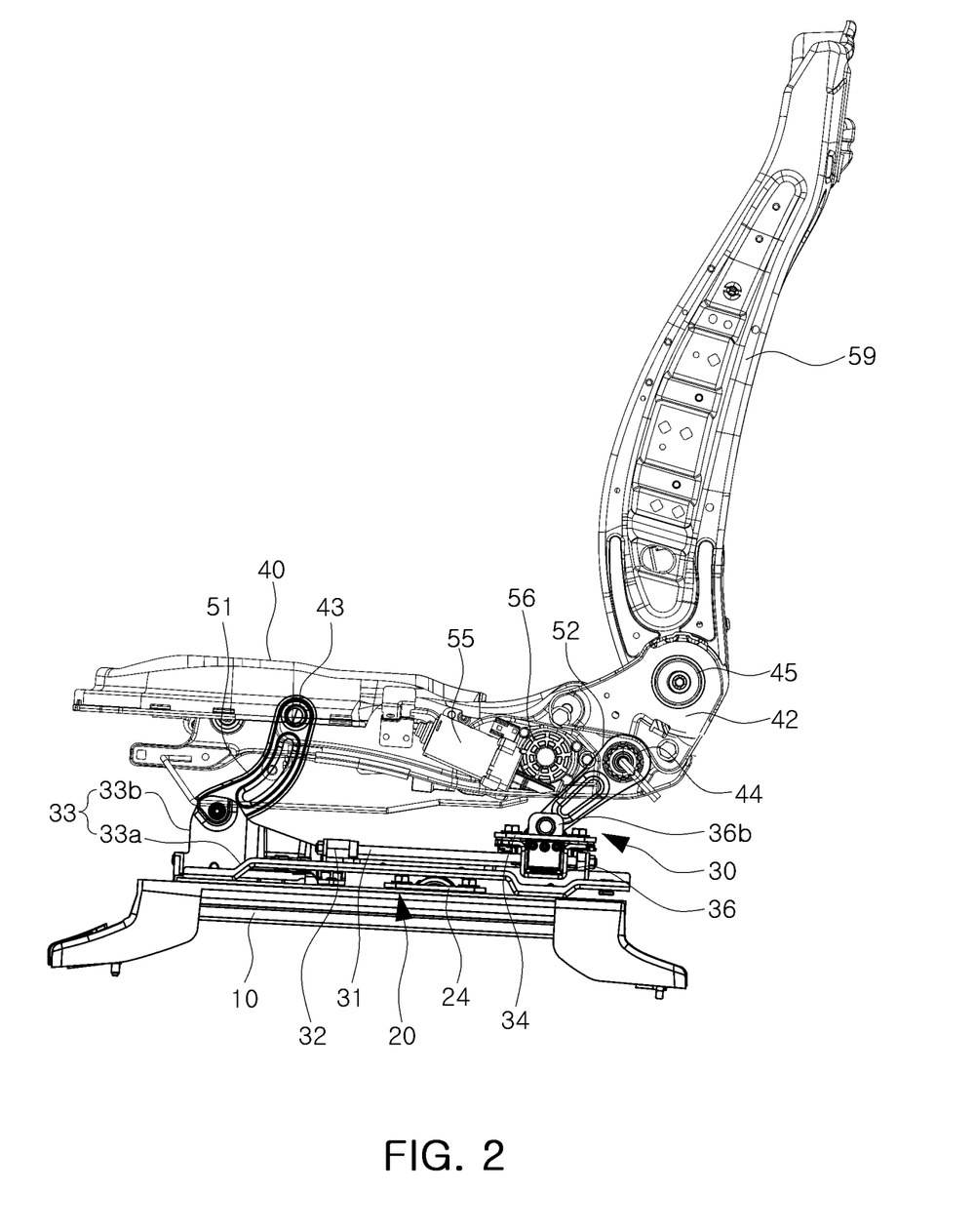
FIG. 2 is a side view of FIG. 1, showing a reference posture for operation.
Figure 3:
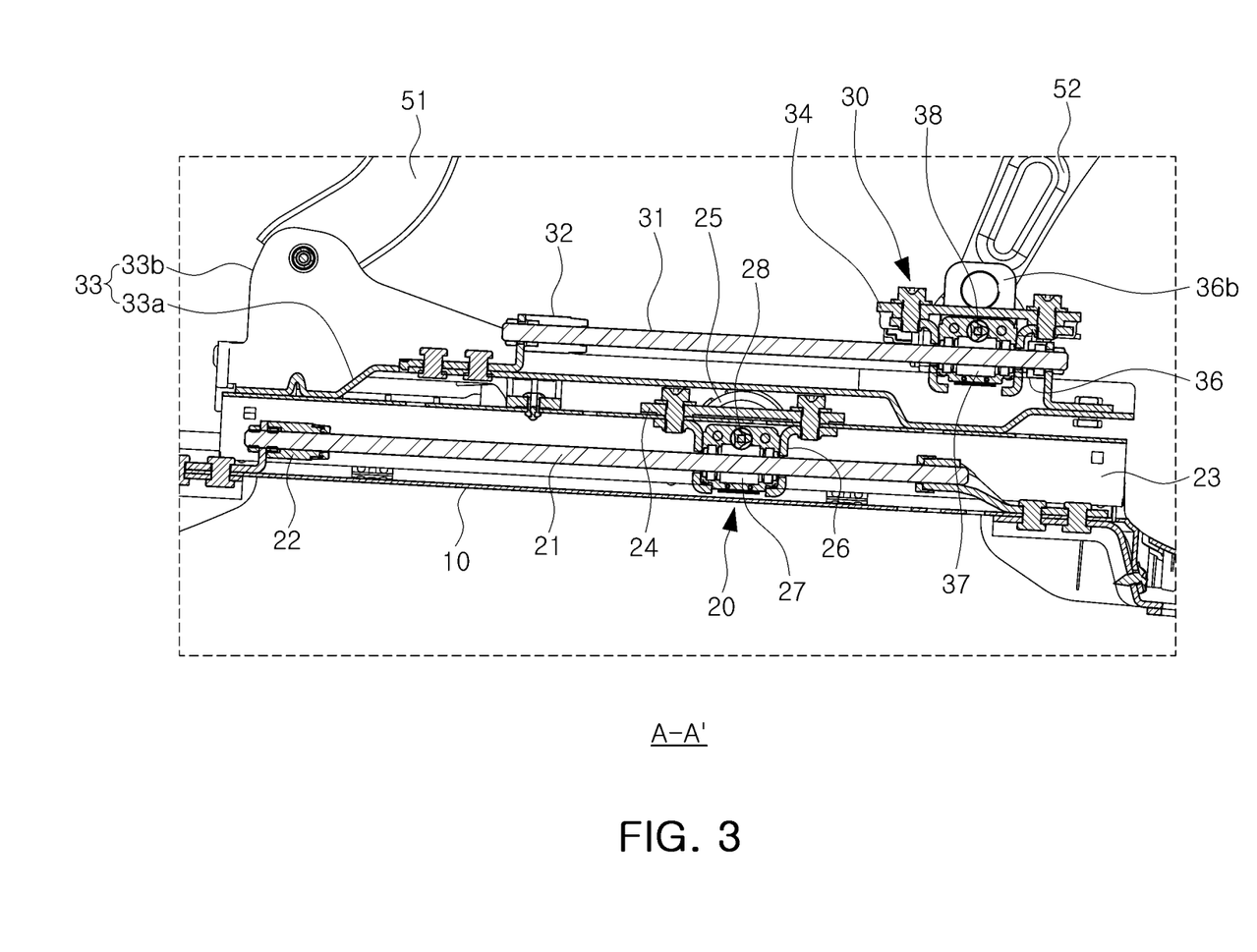
FIG. 3 is a cross-sectional view taken along line A-A' of FIG. 1.

FIG. 1 is a perspective view showing an example seat for a vehicle, and FIG. 2 is a side view of FIG. 1, showing a reference posture for operation. FIG. 3 is a cross-sectional view taken along line A-A' of FIG. 1.

An example seat for a vehicle may comprise a seat cushion for seating of the lower body, a seat back on which the upper body may lean, and/or a headrest for supporting the head and/or the neck.

As shown in FIG. 1, the seat for a vehicle may comprise a pair of support rails 10, (which may be referred to as a support rail 10), a first slide unit 20, a second slide unit 30, a pair of cushion side frames 40, a first link member 51, and/or a second link member 52.

For example, the first slide unit 20 and the second slide unit 30 may constitute a double slider.

The pair of support rails 10 may be fixedly mounted to the floor panel in the interior of the vehicle. An open passage 11 elongated back and forth for sliding movement of the first slide unit 20 may be formed on the upper portion of the support rail 10. The hollow portion inside of the support rail 10 may be configured as a sliding movement path of the first slide unit 20.

The first slide unit 20 may be manipulated by manual control of a towel bar. Alternatively or additionally, the first slide unit 20 may be manipulated by an electric motor according to control of a switch (e.g., as described herein).

As shown in FIGS. 1 and 3, for example of electric powered manipulation, the first slide unit 20 may comprise a first lead screw 21, a stopper 22, a moving rail 23, a first mounting bracket 24, a first motor 25, and/or a first gearbox 26.

The first lead screw 21 may be disposed inside the support rail 10 in the longitudinal direction of the support rail 10. The first lead screw 21 may have a thread formed on an outer circumferential surface. Both ends of the first lead screw 21 may be respectively coupled to a pair of stoppers 22 fixedly installed on the support rail 10, such that the first lead screw 21 may be fixedly supported by the stoppers 22.

The moving rail 23 may be inserted into the support rail 10 and may slide back and forth in the longitudinal direction of the support rail 10 in the hollow portion of the support rail 10.

The first mounting bracket 24 may be positioned between a pair of moving rails 23 to couple to the moving rails 23.

The first motor 25 may comprise a motor shaft of the first motor 25 and may be firmly fixed on the first mounting bracket 24. The motor shaft of the first motor 25 may extend to both sides in the axial direction of the first motor 25, such that both ends of the motor shaft of the first motor 25 may be respectively connected to a pair of moving rails 23. For example, the end of the motor shaft of the first motor 25 may pass through the side wall of the moving rail 23.

The first gearbox 26 may be fixed to the moving rail 23. At least one end of the motor shaft of the first motor 25 may be inserted into the first gearbox 26. The first lead screw 21 may be formed and installed to pass through the first gearbox 26. In the first gearbox 26, for example, a worm wheel 27 that meshes with the first lead screw 21 and moves along the first lead screw 21 during rotation, and a worm shaft 28 that coupled to the end of the motor shaft of the first motor 25 and meshing with the worm wheel 27 in a direction orthogonal to the worm wheel 27 may be disposed.

In response to a user request, for example, (e.g., a switch operation) the first motor 25 may be driven, and the motor shaft of the first motor 25 may rotate. The worm shaft 28 coupled to the motor shaft of the first motor 25 may rotate such that the worm wheel 27 meshing with the worm shaft 28 may rotate. The power of the first motor 25 may be transmitted to the worm wheel 27 through the motor shaft of the first motor 25 and/or the worm shaft 28, and therefore, the worm wheel 27 may rotate.

Since the first lead screw 21 is fixed in the support rail 10, the worm wheel 27 meshing with the first lead screw 21 may relatively move along the first lead screw 21. Accordingly, the entire first gearbox 26 including the worm wheel 27 may move along the first lead screw 21, and the moving rail 23 coupled to the first gearbox 26 may move relative to the support rail 10 in the longitudinal direction of the support rail 10.

For example, the first mounting bracket 24 coupled to the moving rail 23 may move together with the first motor 25 fixed on the first mounting bracket 24.

The cushion side frame 40 coupled with the moving rail 23 may move together, thereby adjusting the front and rear positions of the seat.

The configuration of the first slide unit 20 of the electric type need not be limited to the above-described example. For example, the first slide unit 20 may comprise a motor, a gearbox, a pinion connected to an output shaft of the gearbox, and/or a rack gear engaged with the pinion and/or installed on the support rail (e.g., to automatically move the moving rail 23 within the support rail 10).

As the first slide unit 20 of the manual type, a towel bar mechanism including a latch may be employed. Since towel bar mechanisms having various configurations are already known, a detailed description thereof will be omitted.

The second slide unit 30 may be installed on the moving rail 23 of the first slide unit 20 and may move in the longitudinal direction of the support rail 10 together with the moving rail 23.

The seat for a vehicle may comprise a support bracket 33 coupled to the moving rail 23, for installation of the second slide unit 30. The support bracket 33 may comprise a mounting portion 33a for installation of the second slide unit 30, and/or a first hinge portion 33b for coupling with the first link member 51. This support bracket 33 may be integrally formed with the moving rail 23, or may be separately made and then assembled with the moving rail 23.

The second slide unit 30 may comprise a second lead screw 31, a stopper 32, a second mounting bracket 34, a second motor 35, and/or a second gearbox 36.

The second lead screw 31 may be disposed along the longitudinal direction of the moving rail 23 on the moving rail 23. The second lead screw 31 may have a thread formed on an outer circumferential surface. Both ends of the second lead screw may be respectively coupled to a pair of stoppers 32 fixedly installed on the support bracket 33, such that the second lead screw 31 may be fixedly supported by the stoppers 32.

The second mounting bracket 34 may be positioned between the pair of moving rails 23 to couple to the pair of second lead screws 31.

The second motor 35 may comprise a motor shaft. The second motor 35 may be firmly fixed on the second mounting bracket 34. The motor shaft of the second motor 35 may extend to both sides in the axial direction of the second motor 35, and both ends of the motor shaft of the second motor 35 may be respectively coupled to the pair of second lead screws 31.

For example, the first motor 25 and the second motor 35 may be alternately disposed in the width direction of the sheet (e.g., in the left and right of the sheet so that there is no interference therebetween). As shown in FIG. 1, the first motor 25 may be positioned to be biased toward the left side of the seat, and the second motor 35 may be positioned to be biased to the right side of the seat.

The second gearbox 36 may be formed and installed such that at least one end of the motor shaft of the second motor 35 is inserted into the second gearbox 36. The second lead screw 31 may pass through the second gearbox 36. In the second gearbox 36, for example, a worm wheel 37 may mesh with the second lead screw 31 and may be moved along the second lead screw 31 during rotation, and a worm shaft 38 may be coupled to the end of the motor shaft of the second motor 35 and may mesh with the worm wheel 37 in a direction orthogonal to the worm wheel 37.

A second hinge portion 36b for coupling with the second link member 52 may be formed on the outside of the second gearbox 36.

For example, the second motor 35 may be driven in response to a user's request (e.g., a switch operation), and the motor shaft of the second motor 35 may rotate. The worm shaft 38 coupled to the motor shaft of the second motor 35 may rotate so that the worm wheel 37 meshing with the worm shaft 38 may rotate. The power of the second motor 35 may be transmitted to the worm wheel 37 through the motor shaft of the second motor 35 and/or the worm shaft 38, and therefore, the worm wheel 38 may rotate.

Since the second lead screw 31 is fixed on the support bracket 33, the worm wheel 37 meshing with the second lead screw 31 may relatively move along the second lead screw 31. Accordingly, the entire second gearbox 36 including the worm wheel 37 may move along the second lead screw 31, and the second link member 52 coupled to the second gearbox 36 may move and rotate relative to the moving rail 23 and the support rail 10 in the longitudinal direction of the moving rail 23 and in the longitudinal direction of the support rail 10.

For example, the second mounting bracket 34 coupled to the second gearbox 36 may move together with the second motor 35 fixed on the second mounting bracket 34.

The cushion side frame 40 coupled to the second gearbox 36 may rotate while moving together, thereby adjusting the tilting of the seat.

The configuration of the second slide unit 30 need not be limited to the above-described example. For example, the second slide unit 30 may comprise a motor, a gearbox, a pinion connected to the output shaft of the gearbox, and/or a rack gear engaged with the pinion and/or installed on the moving rail (e.g., to automatically move the second gearbox 36 on the moving rail 23).

The pair of cushion side frames 40 may be a pair of members having the same shape arranged on the left and right sides of the seat. At least one support member 41 connecting and supporting the cushion side frames 40 may be interposed between the cushion side frames. The support member 41 may be formed of a tubular member having a circular cross-section.

Each cushion side frame 40 may comprise a first hinge hole 43 formed in one side and/or a second hinge hole 44 formed in the other side.

One end of the first link member 51 may be rotatably hinged to the first hinge hole 43 of the cushion side frame 40, and the other end of the first link member 51 may be rotatably hinged to the first hinge portion 33b of the support bracket 33 that is coupled to the moving rail 23 of the first slide unit 20.

One end of the second link member 52 may be rotatably hinged to the second hinge hole 44 of the cushion side frame 40, and the other end of the second link member may be rotatably hinged to the second hinge portion 36b of the second gearbox 36 that is movably coupled to the second lead screw 31 of the second slide unit 30.

As shown in FIG. 2, the first link member 51 may be located on the front side of the seat and may be hinged to the first hinge portion 33b of the support bracket 33 coupled to the first slide unit 20, while the second link member 52 may be located on the rear side of the seat and may be hinged to the second hinge portion 36b of the second gearbox 36 constituting the second slide unit 30.

Although the FIGS. 1-3 show that the first link member 51 corresponds to the front link member and the second link member 52 corresponds to the rear link member, the coupling and/or arrangement relationship of the link members need not be necessarily limited thereto.

The coupling and/or arrangement relationship of the link members may be configured opposite to the above-described configuration. For example, the first link member 51 may be positioned on the front side of the seat and may be hinged to the second hinge portion 36b of the second gearbox 36 constituting the second slide unit 30. The second link member 52 may be located on the rear side of the seat and may be hinged to the first hinge portion 33b of the support bracket 33 coupled (e.g. linked) to the first slide unit 20.

To the first link member 51 and/or the second link member 52 hinged to the second hinge portion 36b of the second gearbox 36 constituting the second slide unit 30, a third motor 55 capable of applying a rotational force to the first link member 51 and/or the second link member 52 may be coupled.

As shown in FIGS. 1 and 2, the third motor 55 may be mounted on the outer side surface of the one of cushion side frames 40.

If the second link member 52 is located on the rear side of the seat and is hinged to the second hinge portion 36b of the second gearbox 36 constituting the second slide unit 30, the second link member 52 may rotate on the rear side of the seat by the driving of the third motor 55, and therefore, the height of the entire seat cushion or the height of at least the rear end of the seat cushion may be adjusted.

A third gearbox 56 may be coupled to the motor shaft of the third motor 55, and/or a sector gear (not illustrated) engaged with the output gear of the third gearbox may be formed on one side of the second link member 52. Accordingly, the power of the third motor 55 may be transmitted to the second link member 52 through the motor shaft of the third motor 55, the third gearbox 56, and/or the sector gear. Thus, the second link member 52 may be rotated centering on the second hinge portion 36b of the second gearbox 36.

The support member 41 connecting the cushion side frames 40 may be fixedly coupled to one end of the second link member 52.

As shown in FIG. 1, the support member 41 may be positioned on the rear side of the seat, between the pair of left and right side cushion side frames 40. Both ends of the support member 41 may pass through each cushion side frame 40 to be coupled thereto, and to enable relative rotation with respect to the cushion side frames 40.

The end of the support member 41 may be fixed to one end of the second link member 52. For example, the end of the support member 41 may pass through the second link member 52, such that the support member 41 and the second link member 52 may be integrally and completely fixedly coupled by welding or any other method.

Accordingly, by receiving the power of the third motor 55, the second link member 52 may be rotated about the second hinge portion 36b of the second gearbox 36 and may move up and down as the support member 41 rotates together with the rotation of the second link member 52.

Due to the vertical movement of the support member 41, both cushion side frames 40 may move up and down. Thus, the seat cushion and/or the entire seat may move up and down to adjust the height. The tilting of the seat cushion may be adjusted.

The second slide unit 30 may be disposed symmetrically on the left and right of the seat, and also, the support member 41 may equally support both cushion side frames 40 and/or both second link members 52, such that the seat for a vehicle may be improved in the clearance and/or crashworthiness of the seat to the existing seat level or more.

A reclining unit 60 may be interposed between the seat cushion and the seat back of the seat for a vehicle. The angle of inclination of the seat back with respect to the seat cushion may be appropriately adjusted by the reclining unit 60. The reclining unit 60 may be powered by a motor.

A connection bracket 42 may be mounted on the rear side of the pair of cushion side frames 40. A hinge portion 45 for coupling the back frame 59 of the seat back may be formed in the connection bracket 42. A hinge hole 54 may be formed in a lower portion of the back frame 59. For example, a bush 64 may be fixedly coupled to the hinge portion 45 of the connection bracket 42, and may be rotatably coupled to the hinge hole 54 of the back frame 59.

The reclining unit 60 may comprise a recliner 61, a shaft 62, a fourth motor 65, and/or a power transmission mechanism 66.

The recliner 61 may be installed to correspond to the hinge hole 54 in the back frame 59. The recliner 61 may substantially rotate the seat back relative to the seat cushion, thereby allowing the angle of inclination of the seat back relative to the seat cushion to be adjusted back and forth. Since recliners having various configurations are already known, a detailed description thereof will be omitted.

For example, the shaft 62 may be disposed along the width direction of the seat. Both ends of the shaft 62 may respectively pass through the hinge holes 54 of the back frame 59 (e.g., on the left and right sides of the seat). Both ends of the shaft 62 may be fixed to the hinge portion 45 of the connection bracket 42.

For example, the shaft 62 may be coaxially coupled to the bush 64. A spline may be formed on the surface of the shaft 62 by machining a groove. A fitting groove may be formed in the bush 64 to be fitted with the spline of the shaft 62. Accordingly, the shaft 62 may be fixed to the connection bracket 42 and/or the cushion side frame 40 through the bush 64.

The shaft 62 may pass through the recliner 61 and may be connected thereto, to therefore switch the recliner 61 into a locked state that fixes the seat back at a predetermined angle due to the rotation of the shaft 62 and an unlocked state that enables rotation of the seat back.

The fourth motor 65 may be fixedly installed on the back frame 59 and may output a rotational force through the motor shaft of the fourth motor 65. For example, the fourth motor 65 may be fixed to the lower portion of the back frame 59 such that the motor shaft of the fourth motor 65 is vertically disposed.

The power transmission mechanism 66 may transmit the rotational force output from the motor shaft of the fourth motor 65 to the shaft 62. The power transmission mechanism 66 may be disposed between the motor shaft of the fourth motor 65 and the shaft 62.

For example, if the motor shaft of the fourth motor 65 and the shaft 62 are disposed at approximately right angles to each other, the power transmission mechanism 66 configured to comprise a worm shaft and/or a worm wheel may thus transmit rotational force from the motor shaft of the fourth motor 65 to the shaft 62 (e.g., and decelerate the rotational force). At least one gear may further be interposed between the worm wheel and the shaft 62.

In response to a user's request (e.g., a switch operation), the fourth motor 65 may be driven, and the motor shaft of the fourth motor 65 may rotate. As the power of the fourth motor 65 is transmitted to the worm wheel, for example, through the motor shaft of the fourth motor 65 and/or the worm shaft, the shaft 62 may relatively rotate.

With the shaft 62 fixed to the connection bracket 42, if a rotational force is input from the motor shaft of the fourth motor 65 to the shaft 62, the fourth motor 65 may rotate around the shaft 62. Since the fourth motor 65 is fixed to the back frame 59, the seat back may rotate about the bush 64 with respect to the seat cushion.

Due to the rotation of the shaft 62, the recliner 61 may be operated to increase or decrease the angle of inclination of the seat back with respect to the seat cushion.

For example, a seat for a vehicle may further comprise a switch (not illustrated) for inputting a user's request, and/or a control unit (not illustrated) controlling operations of the first to fourth motors 25, 35, 55 and/or 65 according to a switch operation.

The control unit may control operations of the first slide unit 20, the second slide unit 30, the first link member 51, the second link member 52, and/or the reclining unit 60 based on the user's switch operation.

For example, the first to fourth motors 25, 35, 55, and/or 65 may be a servo motor and/or a step motor capable of forward and reverse rotation.

Hereinafter, the operation of the seat for a vehicle comprising the above-described configuration will be described.

For example, the seat for a vehicle may basically implement a forward/backward mode.

As shown in FIG. 2, in a state in which the seat for a vehicle maintains the reference posture, the first motor 25 may be driven in response to a user's request (e.g., a switch operation), and the motor shaft of the first motor 25 may rotate in one direction. The worm shaft 28 coupled to the motor shaft of the first motor 25 may rotate and the worm wheel 27 meshing with the worm shaft 28 may rotate.

Since the first lead screw 21 is fixed in the support rail 10, the worm wheel 27 meshing with the first lead screw 21 may relatively move along the first lead screw 21. Accordingly, the entire first gearbox 26 including the worm wheel 27 may move along the first lead screw 21.

The moving rail 23 coupled to the first gearbox 26 may move relative to the support rail 10 in the longitudinal direction of the support rail 10. For example, as the cushion side frame 40 coupled with the moving rail 23 may move together, the seat cushion and/or the entire seat may move forward or backward adjusting the front and rear positions of the seat.

Figure 4:
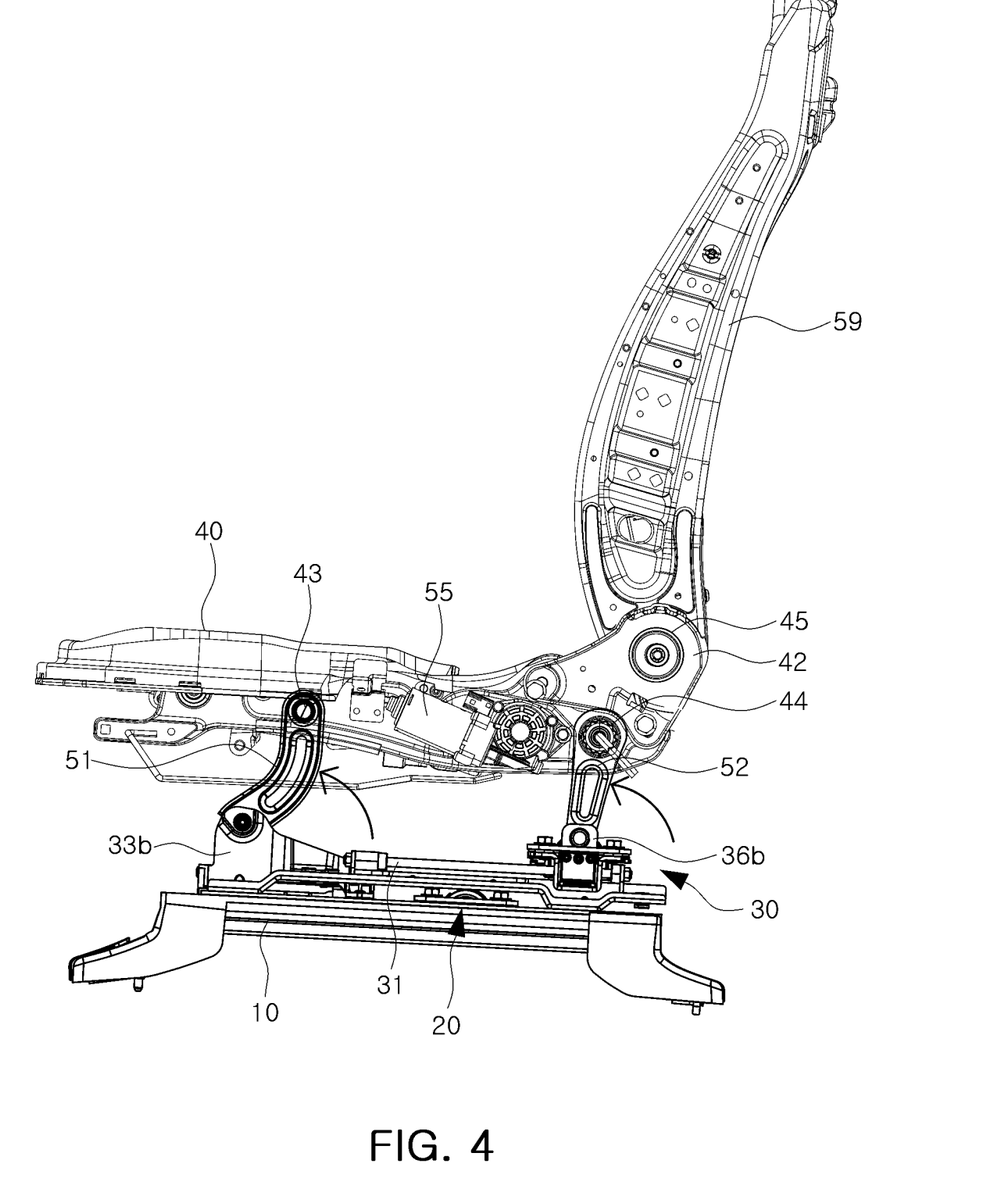
FIG. 4 is a side view showing an example height mode of a seat for a vehicle.

FIG. 4 is a side view showing an example height mode of a seat for a vehicle.

In the seat for a vehicle, the front end and the rear end of the cushion side frame 40 may be raised or lowered at the same time to raise or lower the height of the seat cushion and/or the entire seat.

For example, if the second link member 52 is located on the rear side of the seat and is hinged to the second hinge portion 36b of the second gearbox 36 constituting the second slide unit 30, the third motor 55 connected to the second link member 52 may be driven in response to a user's request (e.g., a switch operation), and the motor shaft of the third motor 55 may rotate in one direction.

Accordingly, the power of the third motor 55 may be transmitted to the second link member 52 through the motor shaft of the third motor 55, the third gearbox 56, and/or the sector gear. Thus, the second link member 52 may rotate forward with the second hinge portion 36b of the second gearbox 36 as the center, and simultaneously, a portion of the cushion side frame 40 connected to the second link member 52 may be raised upwardly.

The second slide unit 30 may not operate. For example, the second motor 35 may not be driven in the height mode. The distance between the first hinge portion 33b and the second hinge portion 36b may not change and may be maintained in an original state thereof.

Due to the rotation of the second link member 52, the first link member 51 may rotate forward about the first hinge portion 33b of the support bracket 33 coupled to the moving rail 23, and at the same time, a portion of the cushion side frame 40 connected to the first link member 51 may be raised upward.

Accordingly, as the front end and the rear end of the cushion side frame 40 rise at the same time, the height of the seat cushion and/or the entire seat may be adjusted to rise. The operation of adjusting the height of the seat to be lowered may be performed by driving the third motor 55 in the previous reverse direction.

In this manner, the height of the seat for a vehicle may be adjusted through the height mode by the structure of the 4-bar linkage.

Figure 5:
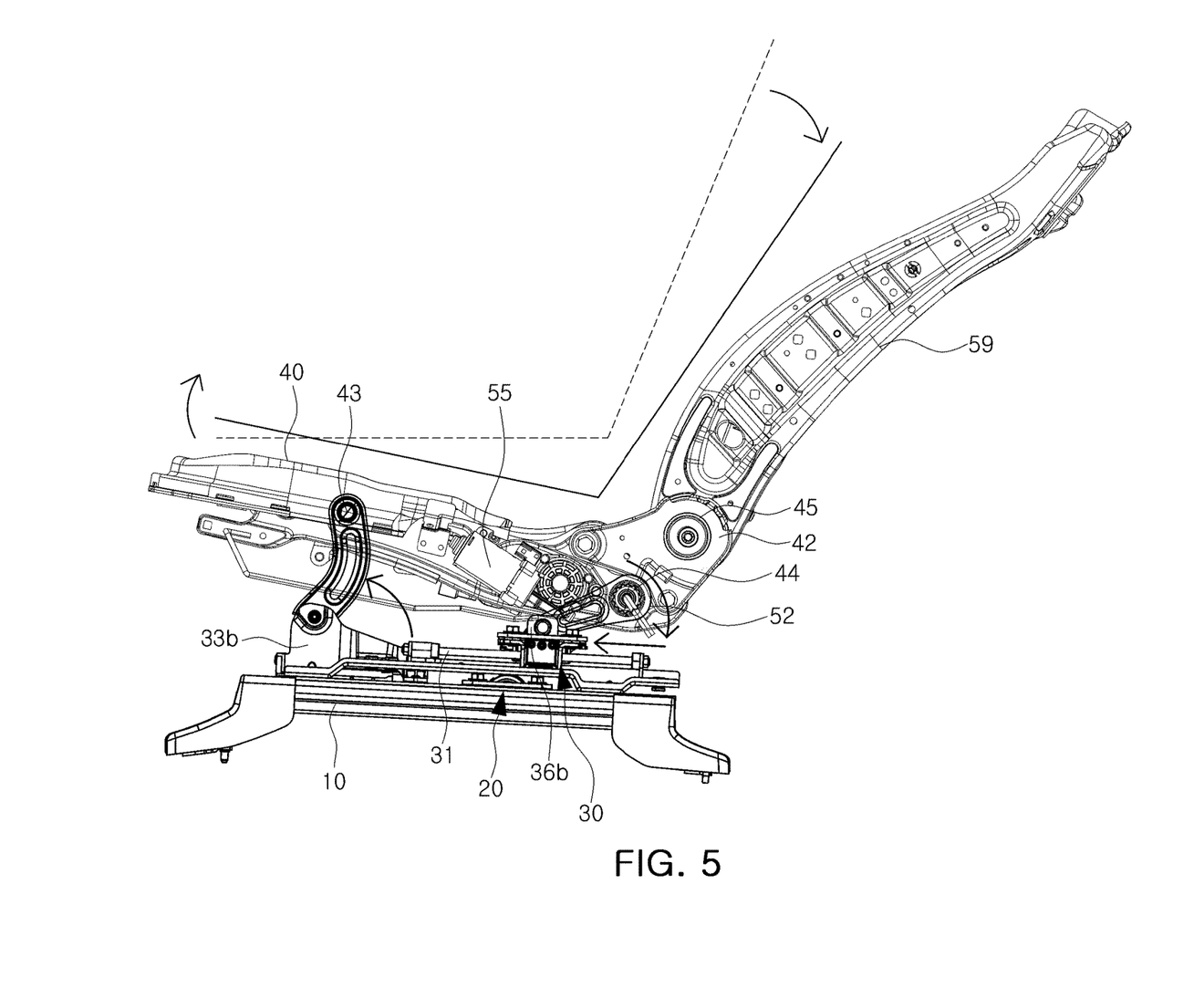
FIG. 5 is a side view showing an example relaxation mode of a seat for a vehicle.

FIG. 5 is a side view showing an example relaxation mode of a seat for a vehicle.

The seat for a vehicle may tilt such that the rear end of the seat cushion may be relatively lowered by lowering and simultaneously moving forward slightly the rear end of the cushion side frame 40.

For example, if the second link member 52 is located on the rear side of the seat and is hinged to the second hinge portion 36b of the second gearbox 36 constituting the second slide unit 30, the third motor 55 connected to the second link member 52 may be driven in response to a user's request (e.g., a switch operation), and the motor shaft of the third motor 55 may rotate in one direction (e.g., the reverse direction in FIG. 3).

Accordingly, the power of the third motor 55 may be transmitted to the second link member 52 through the motor shaft of the third motor 55, the third gearbox 56, and/or the sector gear. Thus, the second link member 52 may be rotated rearwardly about the second hinge portion 36b of the second gearbox 36, and at the same time, a portion of the cushion side frame 40 connected to the second link member 52 may be lowered downward. For example, the second link member 52 may rotate such that the rear end of the seat cushion reaches a lowest position.

The second slide unit 30 may operate. For example, the second motor 35 may be driven, and the motor shaft of the second motor 35 may rotate in one direction. The worm shaft 38 coupled to the motor shaft of the second motor 35 may rotate, and the worm wheel 37 meshing with the worm shaft 38 may rotate.

Since the second lead screw 31 is fixed on the support bracket 33, the worm wheel 37 meshing with the second lead screw 31 may relatively move along the second lead screw 31. Accordingly, the entire second gearbox 36 including the worm wheel 37 may move forward along the second lead screw 31, and the second link member 52 coupled to the second gearbox 36 may relatively move and rotate with respect to the moving rail 23 and the support rail 10 in the longitudinal direction of the moving rail 23 and in the longitudinal direction of the support rail 10.

The cushion side frame 40 coupled to the second gearbox 36 may rotate while moving forward together, thereby the tilting of the seat may be adjusted.

Due to the forward movement of the second gearbox 36, the second link member 52, and/or the cushion side frame 40, the distance between the first hinge portion 33b and the second hinge portion 36b may be reduced, and the first link member 51 may rotate forward around the first hinge portion 33b of the support bracket 33 coupled to the moving rail 23, and at the same time, a portion of the cushion side frame 40 connected to the first link member 51 may be lifted upward.

Accordingly, the front end of the cushion side frame 40 may rise and the rear end thereof may descend. For example, the amount of change in the angle of the seat cushion may be adjusted to be approximately 13° or more, and the lower body of the user may be supported by the tilted seat cushion.

The reclining unit 60 may operate. For example, the fourth motor 65 may be driven, and the motor shaft of the fourth motor 65 may rotate in one direction.

With the shaft 62 fixed to the connection bracket 42, if a rotational force is input from the motor shaft of the fourth motor 65 to the shaft 62 through, for example, the worm shaft and/or the worm wheel, the fourth motor 65 may rotate around the shaft 62. Since the fourth motor 65 is fixed to the back frame 59, the seat back may rotate about the bush 64 with respect to the seat cushion.

The rotation of the shaft 62 may actuate the recliner 61 to increase the angle of inclination of the seat back with respect to the seat cushion.

For example, the angle of inclination of the seat back with respect to the seat cushion may be adjusted within a range of approximately 105° to 120° or any other range, and the user may be supported by the seat back in a state in which the angle of inclination of the seat back is adjusted.

The rear end of the cushion side frame 40 is positioned relatively lower than the front end, and by making the seat back open with respect to the seat cushion, the user may take a convenient and comfortable posture.

In this manner, the seat for a vehicle may implement various postures of the seat through the structure of the 4-bar linkage and the relaxation mode by the second slide unit 30.

Figure 6:
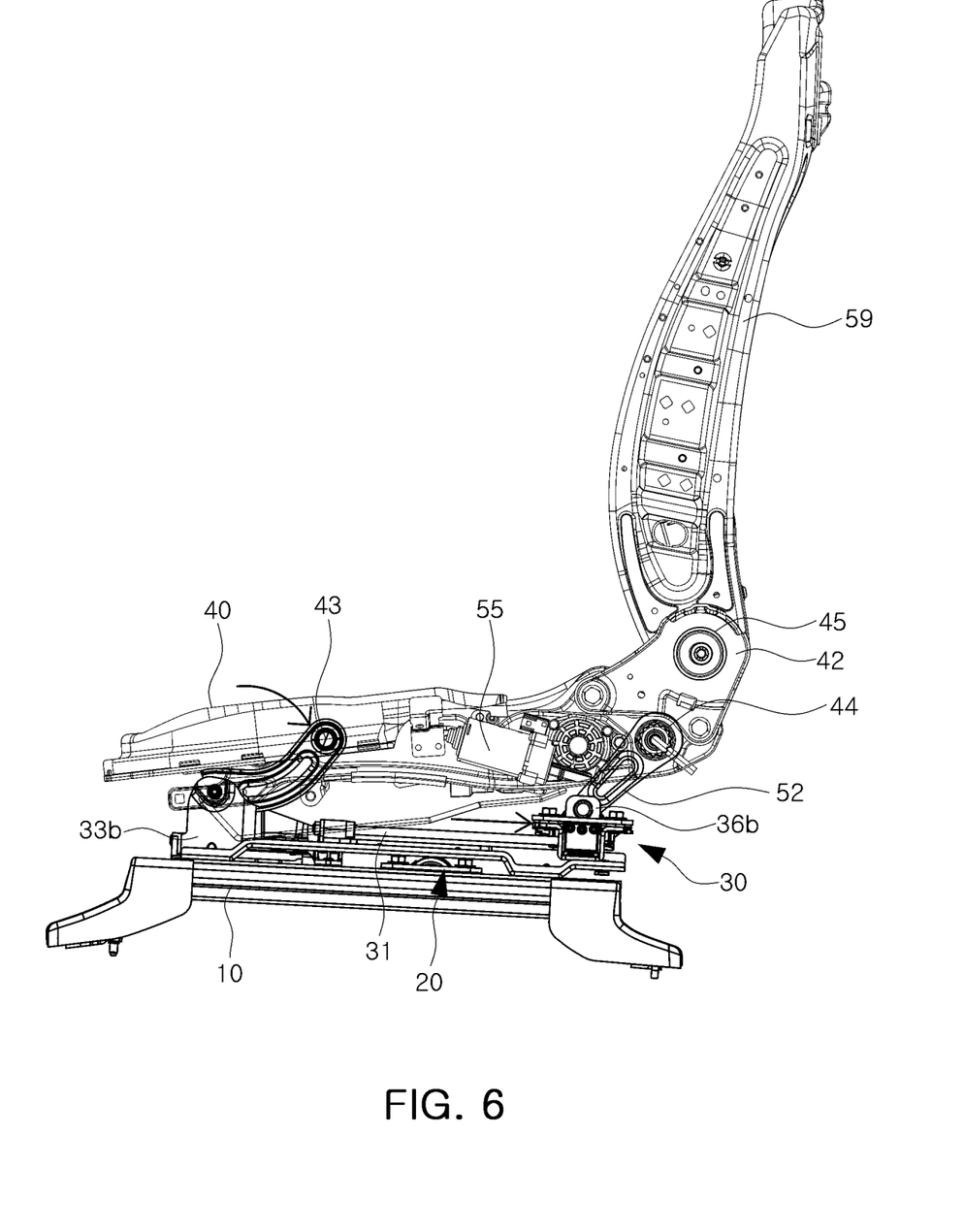
FIG. 6 is a side view showing an example mode of getting in and out of a seat for a vehicle.

FIG. 6 is a side view showing an example mode of getting in and out of a seat for a vehicle.

The seat for a vehicle may tilt such that the front end of the seat cushion is relatively lowed by moving the cushion side frame 40 backward.

For example, if the second link member 52 is located on the rear side of the seat and is hinged to the second hinge portion 36b of the second gearbox 36 constituting the second slide unit 30, the second motor 35 constituting the second slide unit 30 may be driven in response to a user's request (e.g., a switch operation), and the motor shaft of the second motor 35 may rotate in one direction (e.g., the reverse direction in FIG. 5). The worm shaft 38 coupled to the motor shaft of the second motor 35 may rotate and the worm wheel 37 meshing with the worm shaft 37 may rotate.

Since the second lead screw 31 is fixed on the support bracket 33, the worm wheel 37 meshing with the second lead screw 31 may relatively move along the second lead screw 31. Accordingly, the entire second gearbox 36 including the worm wheel 37 may move rearward along the second lead screw 31, and the second link member 52 coupled to the second gearbox 36 may relatively move and rotate with respect to the moving rail 23 and the support rail 10 in the longitudinal direction of the moving rail 23 and in the longitudinal direction of the support rail 10.

As the cushion side frame 40 coupled to the second gearbox 36 may rotate while moving backward together, the tilting of the seat may be adjusted.

Due to the rearward movement of the second gearbox 36, the second link member 52, and/or the cushion side frame 40, the distance between the first hinge portion 33b and the second hinge portion 36b may be increased, and the first link member 51 may rotate backward around the first hinge portion 33b of the support bracket 33 coupled to the moving rail 23, and at the same time, a portion of the cushion side frame 40 connected to the first link member 51 may be lowered downward.

Accordingly, the front end of the cushion side frame 40 may be lowered. For example, as the front end of the cushion side frame 40 is disposed to be relatively lower than the rear end, the seat for a vehicle may provide convenience to the user when getting in and/or out.

In this manner, the seat for a vehicle may implement various postures of the seat through the structure of the 4-bar linkage and the getting in and out mode by the second slide unit 30.

According to an aspect of the present disclosure, a seat for a vehicle includes a pair of support rails coupled to the vehicle and arranged to be spaced apart from side to side; a first slide unit slidably installed back and forth on the support rail; a second slide unit slidably installed back and forth on the first slide unit; a pair of cushion side frames spaced apart from side to side; a first link member connecting the cushion side frame and the first slide unit; and a second link member connecting the cushion side frame and the second slide unit.

The first slide unit may be connected to the support rail and include a moving rail that slides back and forth in a longitudinal direction of the support rail by receiving power from a first motor, and the second slide unit may be installed on the moving rail.

The seat for a vehicle may further include a support bracket coupled to the moving rail, for installation of the second slide unit, and the support bracket may include a mounting portion formed for installation of the second slide unit, and a first hinge portion for connection of the first link member.

The second slide unit may include a second hinge portion for connection of the second link member.

The second slide unit may include a second lead screw disposed on the moving rail in a longitudinal direction of the moving rail and having a thread formed on an outer circumferential surface, a second mounting bracket positioned between both moving rails and connecting both second lead screws, a second motor having a motor shaft and fixed on the second mounting bracket; and a second gearbox into which an end of the motor shaft of the second motor is inserted and the second lead screw passes therethrough, such that the end of the motor shaft is engaged with the second lead screw.

The second hinge portion may be formed on an outside of the second gearbox.

Each cushion side frame may have a first hinge hole in one side and a second hinge hole in the other side, one end of the first link member may be rotatably hinged to the first hinge hole, the other end of the first link member may be rotatably hinged to the first hinge portion, one end of the second link member may be rotatably hinged to the second hinge hole, and the other end of the second link member may be rotatably hinged to the second hinge portion.

The seat for a vehicle may further include a third motor applying a rotational force to the second link member, a motor shaft of the third motor may be connected to a third gearbox, and a sector gear meshing with an output gear of the third gearbox may be formed on one side of the second link member.

The seat for a vehicle may further include a reclining unit interposed between a seat cushion and a seat back, and the reclining unit may include a recliner that receives power of a fourth motor through a shaft and is converted into a locking state in which the seat back is fixed at a predetermined angle and an unlocked state in which the seat back is rotatable.

The seat for a vehicle may execute a relaxation mode by a second motor that provides power to the second slide unit such that the second slide unit may slide forward and backward and a third motor that applies a rotational force to the second link member.

In the relaxation mode, the second link member may rotate by the rotational force applied from the third motor, and at the same time, may lower a portion of the cushion side frame connected to the second link member, the second slide unit may slide by the second motor to move and rotate the cushion side frame, and the first link member may rotate and at the same time may raise a portion of the cushion side frame connected to the first link member.

The seat for a vehicle may further include a reclining unit interposed between a seat cushion and a seat back, and in the relaxation mode, the reclining unit may operate to adjust an angle of inclination of the seat back with respect to the seat cushion.

The seat for a vehicle may execute a getting on and off mode by a second motor providing power to the second slide unit such that the second slide unit may slide forward and backward.

In the getting on and off mode, as the second slide unit slides by the second motor, the second link member may relatively move and may rotate in a longitudinal direction of the support rail, and the cushion side frame may rotate while moving together, and the first link member may be rotated and at the same time lowers a portion of the cushion side frame connected to the first link member.

According to an aspect of the present disclosure, a seat for a vehicle includes a pair of support rails coupled to the vehicle and spaced apart from side to side; a double slider installed to be slidable back and forth on the support rail; a pair of cushion side frames spaced apart from side to side; a front link member hinging the cushion side frame and one side of the double slider to each other; and a rear link member hinging the cushion side frame and the other side of the double slider. The double slider may include a first slide unit hinged to the front link member, and a second slide unit hinged to the rear link member and movable relative to the first slide unit.

As described above, the user's convenience and comfort may be improved by applying a double slider to implement various postures with a relatively simple configuration, and at the same time, the weight and the number of parts are reduced to save the costs, and an excellent packaging effect may be obtained.

If the double sliders are symmetrically disposed on the left and right sides of the seat, there is an effect that the clearance and crashworthiness may be improved beyond the existing seat level.

While various example have been illustrated and described above, it will be apparent to those skilled in the art that modifications and variations could be made without departing from the scope of the present disclosure as defined by the appended claims.

What is claimed is:

1. A vehicle seat comprising:
   a pair of support rails coupled to a vehicle and arranged to be spaced apart from each other;
   a first slide unit slidably installed on a support rail of the pair of support rails;
   a second slide unit slidably installed on the first slide unit;
   a pair of cushion side frames spaced apart from each other;
   a first link member coupling a cushion side frame of the pair of cushion side frames and the first slide unit; and
   a second link member coupling the cushion side frame of the pair of cushion side frames and the second slide unit,
   wherein the first slide unit is coupled to the support rail of the pair of support rails and comprises a moving rail that slides back and forth in a longitudinal direction of the support rail by receiving power from a first motor, and
   wherein the second slide unit comprises:
      a lead screw disposed on the moving rail in a longitudinal direction of the moving rail and having a thread formed on an outer circumferential surface;
      a mounting bracket positioned between the moving rail and a second moving rail;
      a second motor comprising a motor shaft and disposed on the mounting bracket; and
      a gearbox into which an end of the motor shaft of the second motor is inserted, wherein the lead screw passes through the gearbox such that the end of the motor shaft is engaged with the lead screw.

2. The vehicle seat of claim 1, wherein the second slide unit is installed on the moving rail.

3. The vehicle seat of claim 1, further comprising a support bracket coupled to the moving rail, for installation of the second slide unit,
   wherein the support bracket comprises,
      a mounting portion formed for installation of the second slide unit, and
      a first hinge portion for coupling of the first link member.

4. The vehicle seat of claim 3, wherein the second slide unit comprises a second hinge portion for coupling of the second link member.

5. The vehicle seat of claim 4, wherein the second hinge portion is formed on an outside of the gearbox.

6. The vehicle seat of claim 4, wherein a cushion side frame of the pair of cushion side frames has a first hinge hole on a first location and a second hinge hole on a second location,
   a first end of the first link member is rotatably hinged to the first hinge hole, and a second end of the first link member is rotatably hinged to the first hinge portion, and
   a first end of the second link member is rotatably hinged to the second hinge hole, and a second end of the second link member is rotatably hinged to the second hinge portion.

7. The vehicle seat of claim 1, further comprising a third motor configured to apply a rotational force to the second link member,
   wherein a motor shaft of the third motor is coupled to a second gearbox, and
   a sector gear meshing with an output gear of the second gearbox is formed on one side of the second link member.

8. The vehicle seat of claim 1, further comprising a reclining unit interposed between a seat cushion and a seat back,
   wherein the reclining unit comprises a recliner that receives power of a third motor via a shaft, and wherein the recliner is configured to be set in a locking state in which the seat back is fixed at a predetermined angle and an unlocked state in which the seat back is rotatable.

9. A vehicle seat comprising:
a pair of support rails coupled to a vehicle and arranged to be spaced apart from each other;
a first slide unit slidably installed on a support rail of the pair of support rails;
a second slide unit slidably installed on the first slide unit;
a pair of cushion side frames spaced apart from each other;
a first link member coupling a cushion side frame of the pair of cushion side frames and the first slide unit; and
a second link member coupling the cushion side frame of the pair of cushion side frames and the second slide unit,
wherein the vehicle seat is configured to execute a relaxation mode by a first motor that provides power to the second slide unit such that the second slide unit is capable of sliding forward and backward and a second motor that applies a rotational force to the second link member,
wherein in the relaxation mode, the second link member is configured to rotate by the rotational force applied from the second motor and to lower a portion of the cushion side frame coupled to the second link member,
the second slide unit is configured to slide by the first motor to move and rotate the cushion side frame of the pair of cushion side frames, and
the first link member is configured to rotate and raise a portion of the cushion side frame coupled to the first link member.

10. The vehicle seat of claim 9, further comprising a reclining unit interposed between a seat cushion and a seat back,
wherein in the relaxation mode, the reclining unit is configured to adjust an angle of inclination of the seat back with respect to the seat cushion.

11. The vehicle seat of claim 9, wherein the vehicle seat is configured to execute a getting on and off mode by the first motor that provides power to the second slide unit such that the second slide unit is capable of sliding forward and backward.

12. The vehicle seat of claim 11, wherein in the getting on and off mode, as the second slide unit slides by the first motor, the second link member is configured to relatively move and rotate in a longitudinal direction of the support rail, and the cushion side frame is configured to rotate while moving together with the second link member, and
the first link member is configured to rotate and lower a portion of the cushion side frame coupled to the first link member.

13. A vehicle seat comprising:
a support rail coupled to a vehicle;
a double slider installed to be slidable on the support rail;
a cushion side frame;
a front link member hinging the cushion side frame and a first portion of the double slider; and
a rear link member hinging the cushion side frame and a second portion of the double slider,
wherein the double slider comprises:
a first slider hinged to the front link member, and
a second slider hinged to the rear link member and movable relative to the first slider,
wherein in a relaxation mode, the rear link member is configured to rotate by a rotational force applied from a motor and to lower a portion of the cushion side frame coupled to the rear link member,
the second slider is configured to slide to move and rotate the cushion side frame, and
the front link member is configured to rotate and raise a portion of the cushion side frame coupled to the front link member.

14. The vehicle seat of claim 13, wherein the vehicle seat is configured to execute the relaxation mode by the motor that applies the rotational force to the rear link member and by a second motor that provides power to the second slider such that the second slider is capable of sliding forward and backward.

15. The vehicle seat of claim 13, wherein the vehicle seat is configured to execute a different mode by a second motor providing power to the second slider such that the second slider is capable of sliding forward and backward, and
wherein the different mode is different from the relaxation mode.

16. The vehicle seat of claim 15, wherein the different mode comprises a getting on and off mode.

17. The vehicle seat of claim 13, further comprising a recliner interposed between a seat cushion and a seat back,
wherein in the relaxation mode, the recliner is configured to adjust an angle of inclination of the seat back with respect to the seat cushion.

* * * * *